United States Patent
Perrot et al.

(10) Patent No.: US 7,912,084 B2
(45) Date of Patent: Mar. 22, 2011

(54) METHOD OF TRANSMITTING IEEE 1394 DATA OVER A WIRELESS LINK AND APPARATUS IMPLEMENTING THE METHOD

(75) Inventors: Sébastien Perrot, Issy les Moulineaux (FR); Ludovic Jeanne, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1304 days.

(21) Appl. No.: 10/584,652

(22) PCT Filed: Jan. 4, 2005

(86) PCT No.: PCT/EP2005/050025
§ 371 (c)(1), (2), (4) Date: Jun. 26, 2006

(87) PCT Pub. No.: WO2005/069547
PCT Pub. Date: Jul. 28, 2005

(65) Prior Publication Data
US 2009/0144470 A1  Jun. 4, 2009

(30) Foreign Application Priority Data
Jan. 6, 2004 (FR) .................. 04 00071

(51) Int. Cl.
*H04J 3/16* (2006.01)
*H04J 3/22* (2006.01)
*H04L 12/28* (2006.01)

(52) U.S. Cl. ...................................................... 370/466
(58) Field of Classification Search .................. None
See application file for complete search history.

(56) References Cited

U.S. PATENT DOCUMENTS

| 6,829,228 | B2 * | 12/2004 | Takabatake et al. | 370/338 |
| 6,993,005 | B2 * | 1/2006 | Takabatake et al. | 370/338 |
| 7,415,535 | B1 * | 8/2008 | Kuik et al. | 709/245 |
| 2003/0037169 | A1 * | 2/2003 | Kitchin | 709/249 |
| 2004/0131071 | A1 * | 7/2004 | Schweidler et al. | 370/419 |

(Continued)

FOREIGN PATENT DOCUMENTS
EP  1041770  10/2000
(Continued)

OTHER PUBLICATIONS

Jeon, Ho-In, 1394 Wireless Home Network, Korean Institute of Communication and Science, Journal of Information and Communication, vol. 19, No. 5, pp. 63-78.*

(Continued)

*Primary Examiner* — Daniel J Ryman
*Assistant Examiner* — Christopher Crutchfield
(74) *Attorney, Agent, or Firm* — Robert D. Shedd; Jospeh J. Opalach; Catherine A. Cooper (57) ABSTRACT

The invention relates to a method of transmitting data over a wireless link, comprising the insertion of the data into packets according to a format corresponding to at least certain layers of a first protocol for data transmission over a wireless network, as well as the use of these packets to form a frame in accordance with a second protocol for data transmission over a wireless network, different from the first protocol, and the transmission over the wireless network according to the second protocol. The invention also relates to the apparatus implementing the method.

10 Claims, 7 Drawing Sheets

U.S. PATENT DOCUMENTS

| | | | |
|---|---|---|---|
| 2005/0033894 A1* | 2/2005 | Haupt et al. | 710/310 |
| 2005/0063405 A1* | 3/2005 | Borsum et al. | 370/419 |

FOREIGN PATENT DOCUMENTS

| | | |
|---|---|---|
| EP | 1318644 | 6/2003 |
| EP | 1361713 | 11/2003 |
| JP | 2002-335285 A | 11/2002 |
| WO | WO 02/13429 | 2/2002 |
| WO | WO 02/41586 | 5/2002 |
| WO | 03063432 A1 | 7/2003 |

OTHER PUBLICATIONS

Author Unknown, Broadband Radio Access networks; HIPERLAN Type 2; Part 3: IEEE Service Specific Convergence Sublayer (SSCS).*

Steven Williams and Benno Ritter, 1394 Requirements of 802.11 QoS, IEEE 802.11 Working Group Submission, Mar. 2001, pp. 1-17.*

Author Unknown, Broadband Radio Access networks; HIPERLAN Type 2; Part 3: IEEE Service Specific Convergence Sublayer (SSCS)), European Telecommunications Standards Institute (ESTI) Technical Specification (TS) 101 493-3, Version 1.2.2, pp. 1-74, Dec. 2001.*

Radia Perlman, Interconnections: Bridges, Routers, Switches and Internetworking Protocols, Second Edition, Sep. 14, 1999, pp. 1-4.*

Author Unknown, Protocol Adaptation Layer (PAL) for IEEE 1394 over IEEE 802.15.3, 1394 Trade Association Wireless Working Group, May 7, 2004, pp. 1-125.*

Search Report Dated Apr. 25, 2005.

* cited by examiner

METHOD OF TRANSMITTING IEEE 1394 DATA OVER A WIRELESS LINK AND APPARATUS IMPLEMENTING THE METHOD

This application claims the benefit, under 35 U.S.C. §365 of International Application PCT/EP05/050025, filed Jan. 4, 2005, which was published in accordance with PCT Article 21(2) on Jul. 28, 2005 in English and which claims the benefit of French patent application No. 0400071, filed Jan. 6, 2004.

1. FIELD OF THE INVENTION

The present invention relates to the field of the interconnection of IEEE 1394 serial data buses through wireless links.

2. TECHNICAL BACKGROUND

The IEEE 1394 bus defined in the document 'IEEE Std 1394-1995 High Performance Bus, 1996 Aug. 30' describes a serial bus for digital transmission allowing the connection of apparatuses also referred to as "nodes".

HiperLAN/2 is a standard produced by the ETSI (European Telecommunications Standards Institute) within the framework of its BRAN (Broadband Radio Access Network) project. It defines a communication protocol between apparatuses on a wireless network.

The family of 802.11 standard defines a standard for communication over a wireless network standardized in the document ANSI/IEEE std 802.11-1999.

When one wishes to interconnect several IEEE 1394 buses with a bridge consisting of a wireless network, it is necessary to port the IEEE 1394 protocol over to the standard used by the wireless network. With this in mind, HiperLAN/2, specifies a convergence layer called IEEE 1394 SSCS (Service Specific Convergence Sublayer) in the document "Broadband Radio Access Networks (BRAN); HIPERLAN Type 2; Packet based convergence layer; Part 3: IEEE 1394 Service Specific Convergence Sublayer", which allows the transport of IEEE 1394 data packets in HiperLAN/2 packets. On the other hand such a convergence layer is not standardized in the case of wireless networks operating according to the 802.11 standard, despite an attempt abandoned by the "1394 Trade Association".

3. SUMMARY OF THE INVENTION

When one wishes to interconnect several IEEE 1394 buses through an 802.11 wireless network, it is therefore necessary to develop a convergence layer allowing the transport of the IEEE 1394 data packets in 802.11 packets.

The object of the invention is to define a method of transporting the IEEE 1394 traffic on an 802.11 network relying on the convergence layer 2 standardized for the Hyper-LAN/2, IEEE 1394 SSCS networks. The services of the convergence layer 2 will be used to obtain the packets, called SAR PDU (Segmentation and Re-assembly Packet Data Unit) in the standard, raw or packaged in an LCH (Long Channel) packet in the format used by the Hyperlan/2 DLC (Data Link Control). Subsequently, it is these packets that will be assembled in an 802.11 media access control (MAC) layer 2 frame and dispatched over the 802.11 network. The receiver apparatus operates in the reverse manner, retrieving from the 802.11 layer 2 frame, the SAR PDU's or the LCHs and using an IEEE SSCS module to reconstruct the original IEEE 1394 packet.

This method is particularly advantageous when it is used in an apparatus furnished with an interface circuit between the IEEE 1394 network and the wireless network which is furnished with a hardware SSCS IEEE 1394 module.

The invention relates to a method of transmitting data over a wireless link, comprising the insertion of the data into packets according to a format corresponding to at least certain layers of a first protocol for data transmission over a wireless network, as well as the use of these packets to form a frame in accordance with a second protocol for data transmission over a wireless network, different from the first protocol, and the transmission over the wireless network according to the second protocol.

According to a particular embodiment of the invention the initial data are formatted according to a protocol of a cabled bus.

According to a particular embodiment of the invention the cabled bus is an IEEE 1394 bus, the first protocol for data transmission over a wireless network is HiperLAN/2 and the second protocol for data transmission over a wireless network is a protocol from the 802.11 family.

According to a particular embodiment of the invention the packets used are generated by an IEEE 1394 SSCS module.

According to a particular embodiment of the invention the frames, generated on the basis of the packets according to an intermediate format defined by the said layer or layers of the first protocol for data transmission over a wireless network, the said frames being in accordance with the second protocol for data transmission over a wireless network, are distinguished from the other frames by a specific identifier in the frame.

According to a particular embodiment of the invention the frames, generated on the basis of the packets according to an intermediate format defined by the said layer or layers of the first protocol for data transmission over a wireless network and in accordance with the second protocol for data transmission over a wireless network, are distinguished from the other frames through the use of specific MAC addresses identifying their origin and their destination.

The invention also relates to a data transmission apparatus, containing means making it possible to receive frames according to the protocol and formatted according to a cabled bus, means of connection to a wireless network, a module for processing the frames formatted according to a cabled bus so as to insert the data received on the cabled bus into a frame according to a format defined by a first protocol for data transmission over a wireless network, characterized in that the apparatus contains means for generating transmission frames in accordance with a second protocol for data transmission over a wireless network on the basis of the said packets in which are inserted data received from the cabled bus, the said packets being formatted according to at least certain layers of the first protocol.

According to a particular embodiment of the invention, the apparatus comprises, as far as the second protocol is concerned, only the layers necessary for the encapsulation and the transmission of packets generated with the aid of the said layers of the first protocol.

4. LIST OF DRAWINGS

The invention will be better understood and other features and advantages will become apparent on reading the description which follows, the description making reference to the appended drawings among which.

The exemplary embodiment of the invention which will be described now is set within the framework of the use of an interfacing circuit between a wireless network and a cabled bus. However, the invention may be implemented using other circuits. Certain modules used may be implemented as hardware in a circuit or as software.

5. DETAILED DESCRIPTION OF THE INVENTION

Figure 1:
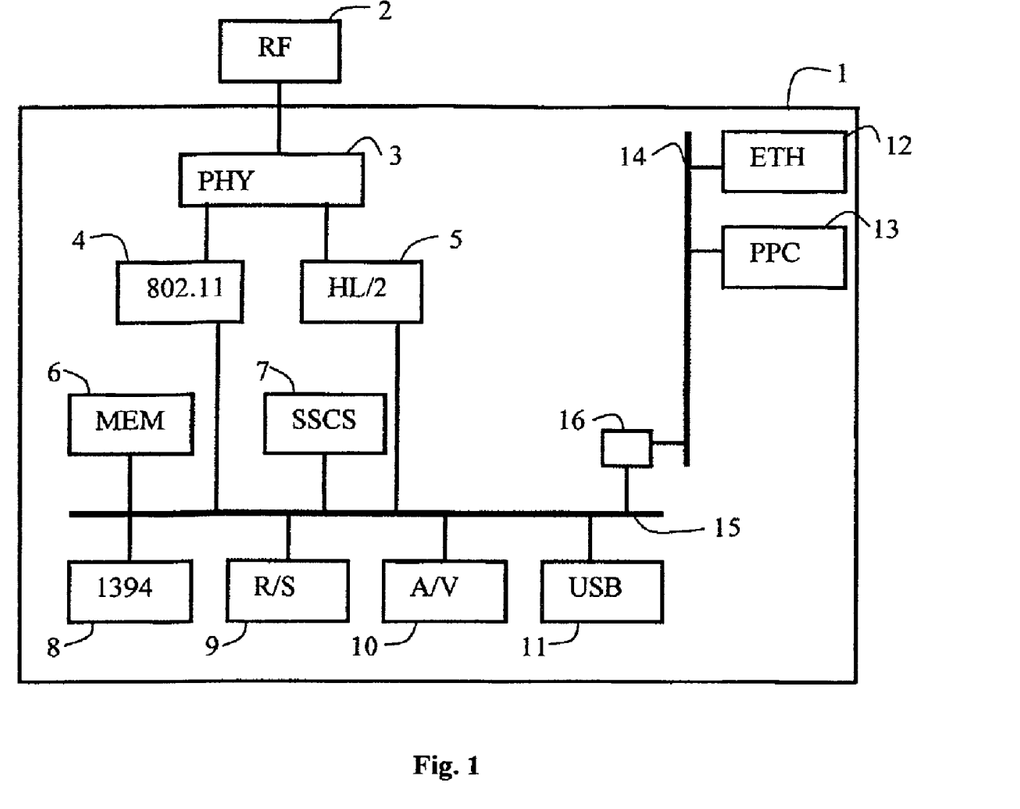
FIG. 1 represents the hardware architecture of the circuit used in the exemplary embodiment of the invention.

FIG. 1 represents the architecture of the circuit. This circuit comprises a generalist central processor 13, for example from the PowerPC (PPC) family connected to its bus 14. Connected to this same bus is an Ethernet network interface 12. The bus 14 is connected by a bridge 16 to a second ARM-AMBA bus 15. Connected to this second bus are various units including, among others, a USB interface 11, an audio/video (A/V) interface 10, a unit for code computation according to the Reed/Salomon (R/S) algorithm 9, a network interface 8 according to the IEEE 1394 standard. The circuit is also connected to an RF emitter/receiver 2 allowing transmission by radio wave in the 5 GHz range. This emitter/receiver 2 is commanded by a physical controller 3. There are two modules capable of using this physical controller 3, on the one part a module 4 implementing the MAC layer of the 802.11a standard and therefore allowing the dispatching and receiving of data packets according to this standard at the MAC level, and on the other hand a module 5 implementing the DLC (Data Link Control) layer of the HiperLAN/2 standard allowing the dispatching and receiving of packets according to this standard via the emitter/receiver 2. An item of equipment fitted with this circuit is therefore able to connect up to wireless networks according to the 802.11a standard and the HiperLAN/2 standard. These two modules 4 and 5 use a DLC memory 6. A hardware module 7 implements the IEEE 1394 SSCS convergence layer as well as the common part responsible for processing the IEEE 1394 frames and consisting of the CPCS (Common Part Convergence Sublayer) layer and the Segmentation And Reassembly layer SAR as defined in FIG. 3. The IEEE 1394 SSCS layer is responsible for transforming the IEEE 1394 frames into a common format with packets of variable size, while the common part will take these packets and append complementation bytes thereto and transmit them to the segmentation and reassembly layer which will chop them into packets of fixed size. These packets of fixed size will be transmitted to the HiperLAN/2 DLC. This common part is defined in the document ETSI TS 101 493-1.

Figure 2:
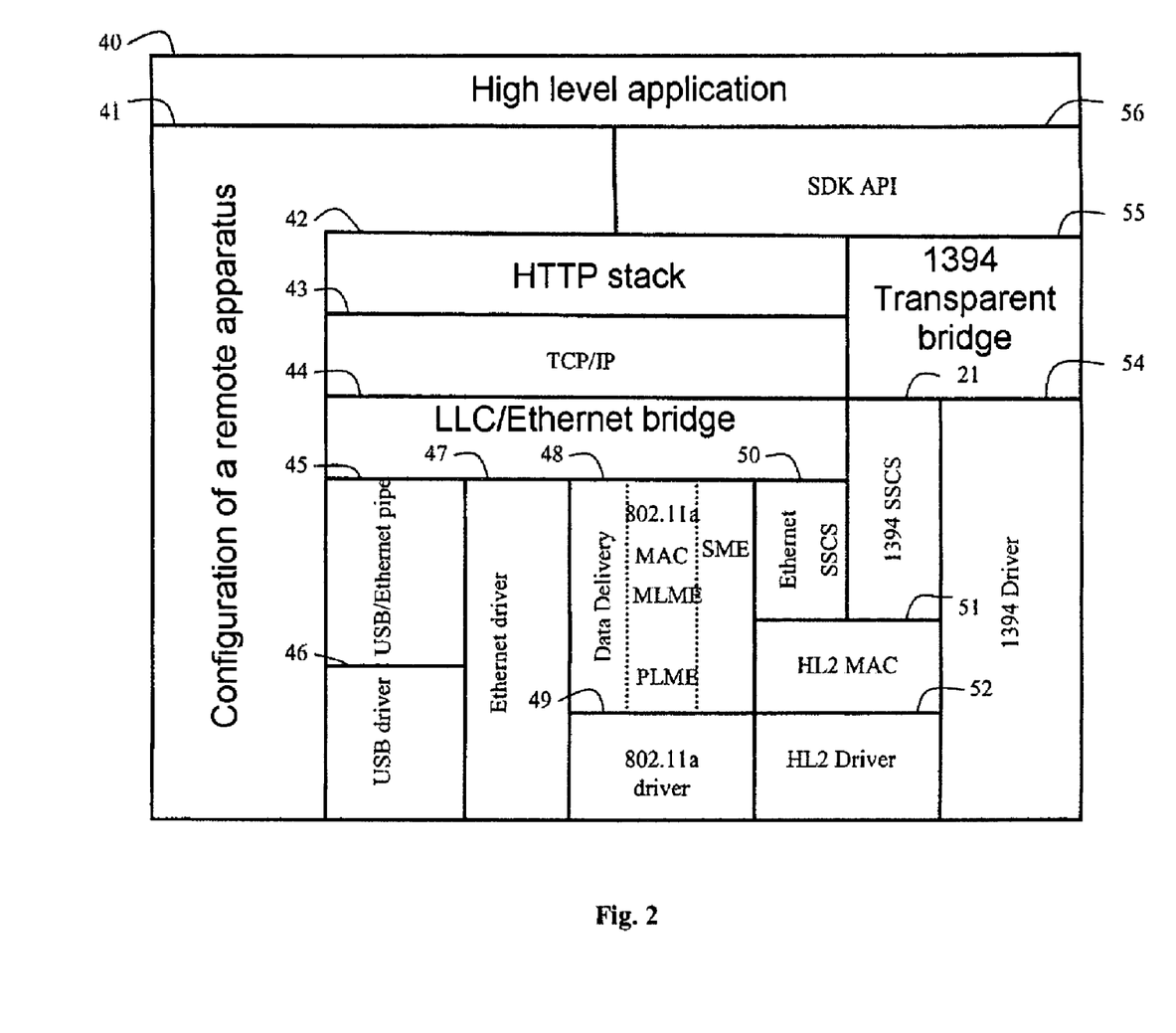
FIG. 2 represents the software architecture of the circuit used in the exemplary embodiment of the invention.

FIG. 2 details the software architecture carried on the circuit. This circuit is furnished with a certain number of software modules commanding the hardware (driver), a module for the IEEE 1394 bus referenced 54, a module for HiperLAN/2 referenced 52, a module for the 802.11 referenced 49, a module for Ethernet referenced 47, a module for the USB referenced 46. Above these drivers are a certain number of MAC layers, the HiperLAN/2 MAC layer referenced 51 containing the DLC, the 802.11 MAC layer referenced 48. The circuit is also furnished with convergence layers allowing the transport of certain protocols over HiperLAN/2 such as the Ethernet SSCS referenced 50 and the IEEE 1394 SSCS referenced 21. The module referenced 55, IEEE 1394 transparent bridge, manages the transparency of the HiperLAN/2 bridge for the IEEE 1394 layer. That is to say several IEEE 1394 buses connected via a HiperLAN/2 network will be able to appear at the level of the IEEE 1394 layer as a single virtual IEEE 1394 bus containing all the nodes of the various interconnected IEEE 1394 buses. The module referenced 44 establishes a bridge between Ethernet and the logical link control LLC layer above the 802.11 MAC layer. Above are the TCP/IP conventional modules 43 and an HTTP stack 42. The high-level applications 40 have access to these modules through an API (Application Program Interface) 56 and configuration layers 41.

Figure 3:
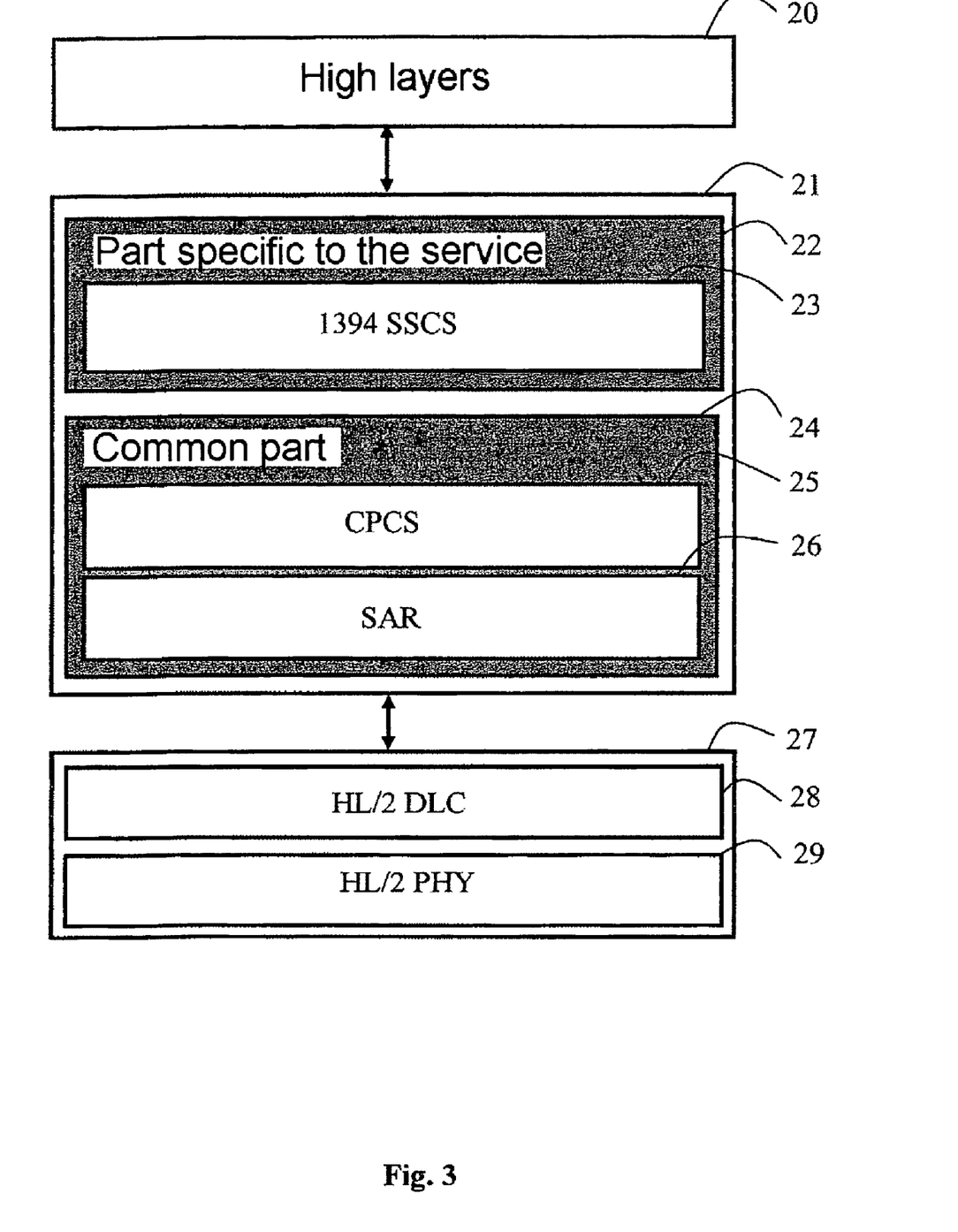
FIG. 3 represents the software architecture of the IEEE 1394 SSCS convergence layer.

FIG. 3 details the software architecture of the IEEE 1394 SSCS convergence layer referenced 21. It offers the high layers referenced 20 an IEEE 1394 service over a HiperLAN/2 network. To do this, it is composed of a part referenced 22 specific to the IEEE 1394 service, containing convergence layers, referenced 23, for various services such as Ethernet or, as far as we are concerned here, IEEE 1394. These various specific convergence layers rely on a part referenced 24 common to all the services and composed of a CPCS module referenced 25 and of an SAR module referenced 26. A data packet, here 1394, will therefore be processed firstly by the 1394 SSCS module specific to the 1394 standard and then subsequently be processed by the common part which will produce so-called SAR-PDU (Packet Data Unit) data packets suitable for processing by the HiperLAN/2 lower layers referenced 27 composed of the DLC 28 (Data Link Control) and of the HiperLAN/2 physical layer referenced 29.

Figure 4:
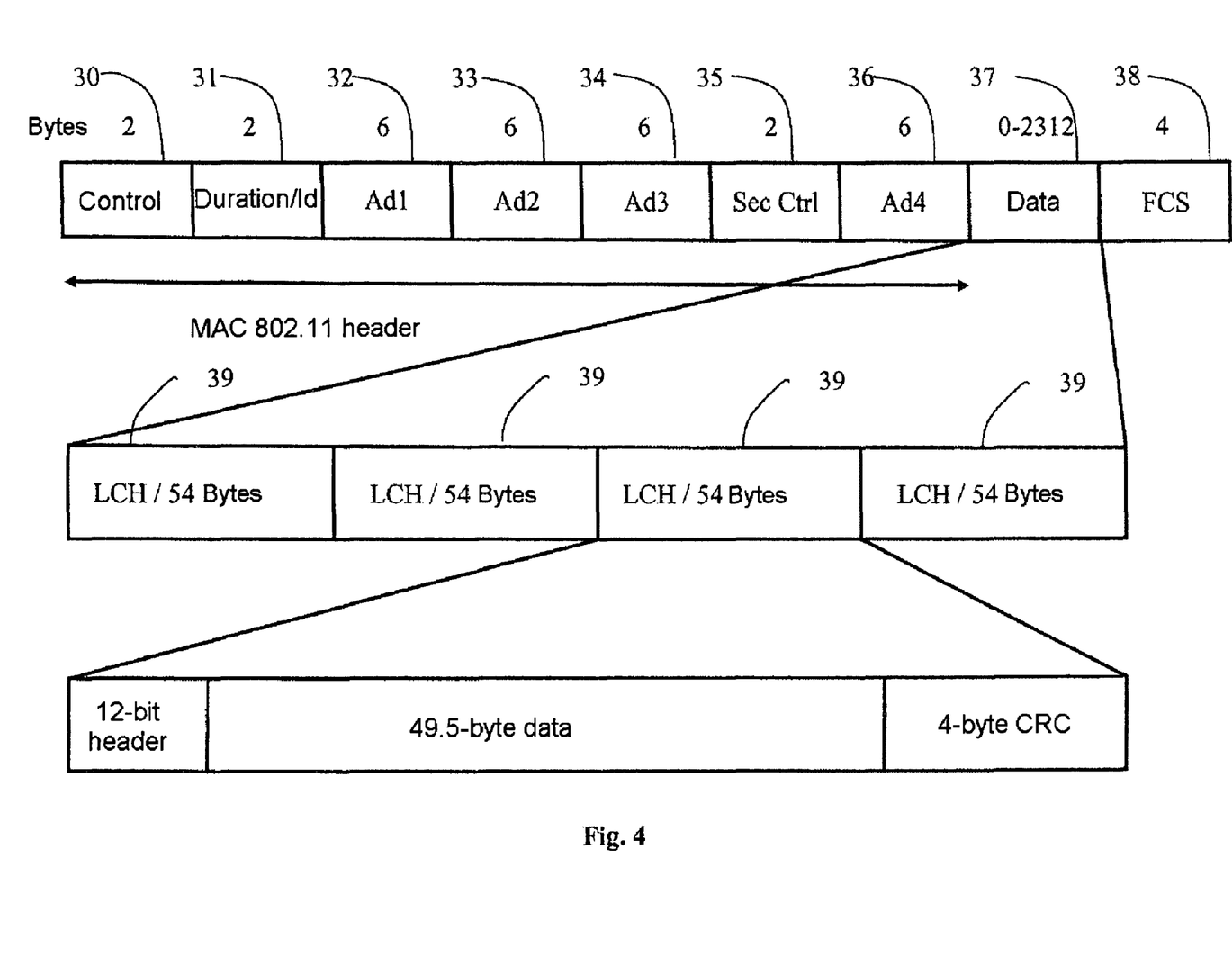
FIG. 4 represents the format of a frame according to the 802.11 standard and according to the invention.

FIG. 4 represents the general format of an 802.11 MAC layer 2 frame generated according to the invention. The meaning of the various fields of the header may be found in the document ANSI/IEEE Std 802.11, 1999 Edition. Following the header is the useful data portion 37 of the frame, followed by a control field 38. The useful data 37 is generally 4 LCH packets 39 having the structure described in FIGS. 5 and 6.

Figure 5:
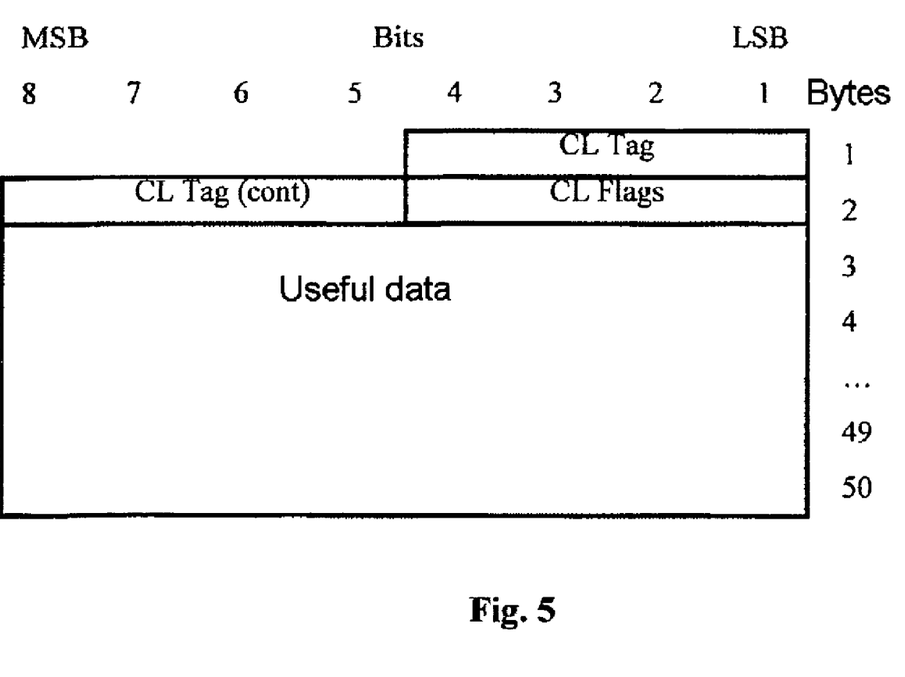
FIG. 5 represents the format of an SAR-PDU packet as constructed by the SAR module of the IEEE 1394 SSCS convergence layer.
Figure 6:
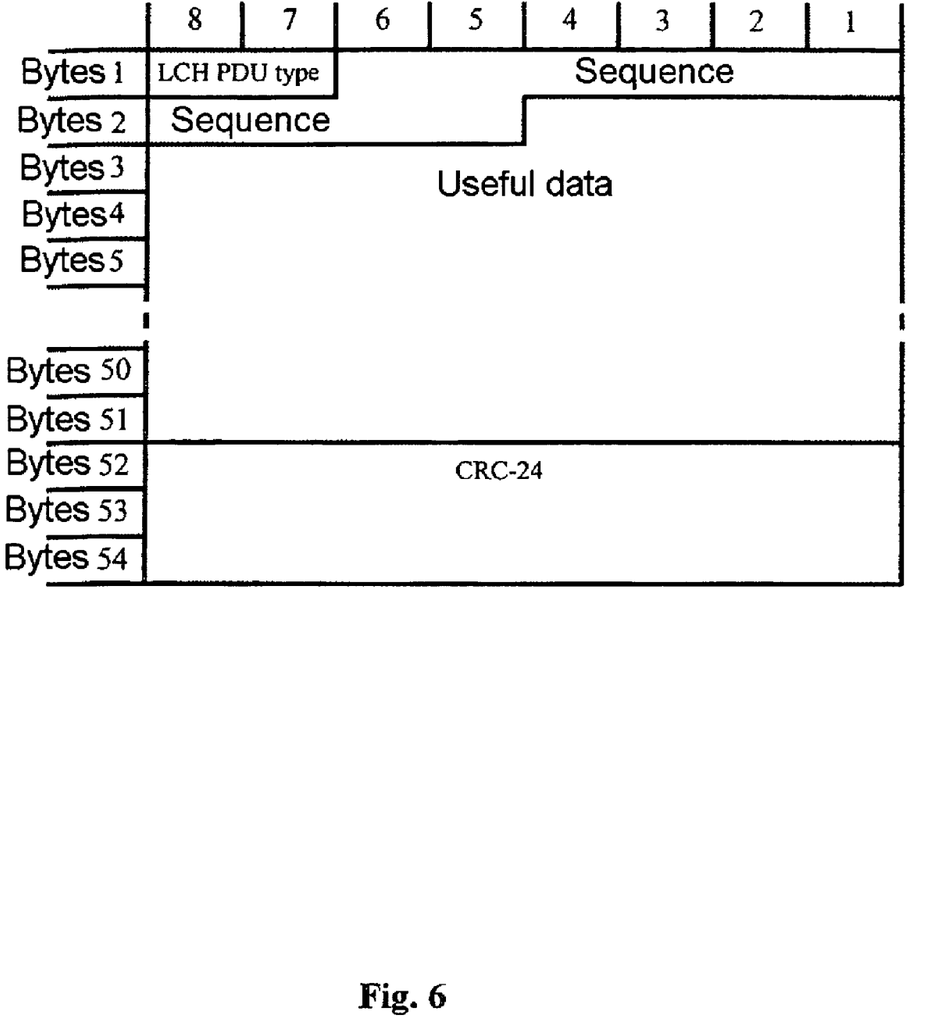
FIG. 6 represents the same packet included in an LCH packet as used by the Hiperlan/2 DLC.
Figure 7:
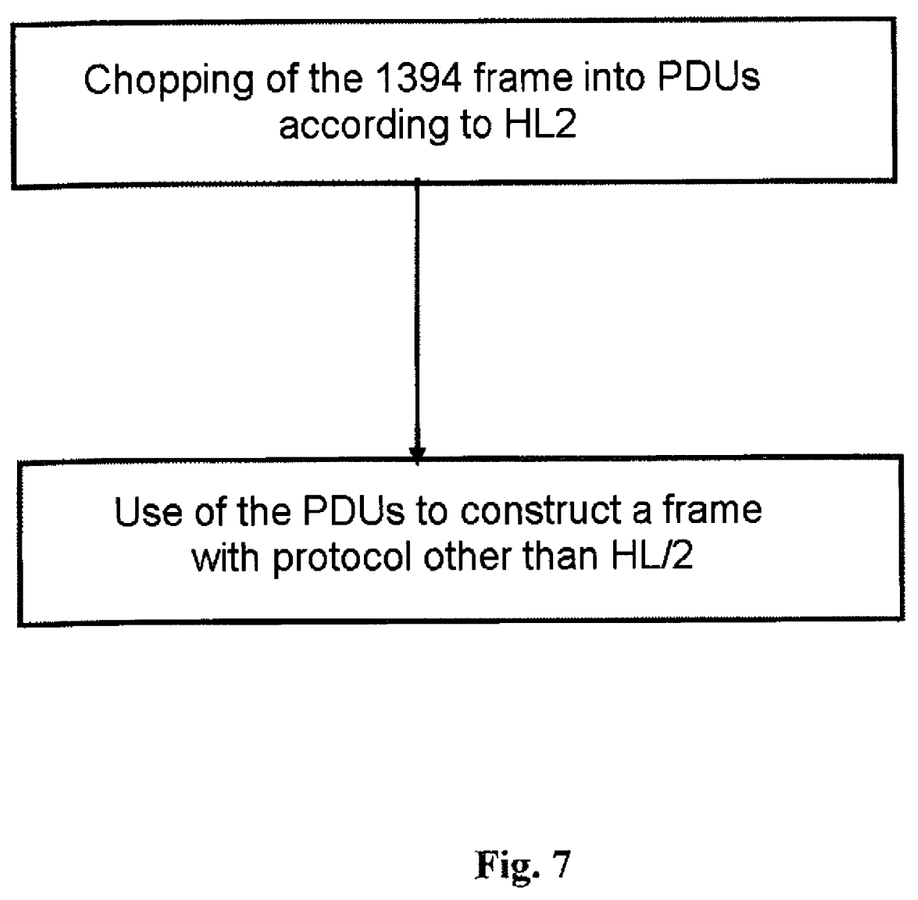
FIG. 7 is a diagram representing the steps of the method according to the invention.

FIG. 5 represents the structure of an SAR-PDU such as it is generated by the SAR. It is a packet of 49.5 bytes containing a 48-byte useful data part preceded by a header of one and a half bytes. This packet is then used by the HiperLAN/2 DLC which encapsulates it into an LCH packet as illustrated by FIG. 6. This LCH is 54 bytes. In the circuit considered, the 1394 SSCS module produces these LCHs directly and ready to be used by the DLC. Encapsulation is effected by appending a type identifying the type of the packet, a sequence number as well as a CRC ensuring the integrity of the packet.

In a conventional mode of operation of the circuit, the asynchronous 1394 traffic can be transferred over a wireless network via the HiperLAN/2 protocol in the following manner. The 1394 packets arrive at the interface 8. These packets are handled by the software 1394 SSCS module implemented on the generalist processor 13. On the basis of this 1394 packet this module generates LCHs which are placed in the memory 6 for access by the DLCs. These LCHs are then handled by the HiperLAN/2 DLC 5 so as to be dispatched over the wireless physical interface 3. The 1394 isochronous traffic for its part will follow the same route except that it will be processed by the hardware 1394 SSCS module 7. However, in the same way, this module will generate 54-byte LCH packets that will be arranged in the DLC memory 6. These LCH packets will then be handled in the same manner by the DLC 5 for dispatch via the wireless network.

Within the framework of the invention, this same asynchronous 1394 traffic may be transferred over a wireless network via the 802.11 protocol instead of the HiperLAN/2 protocol. The 1394 packets arrive at the 1394 interface. They are handled by the software 1394 SSCS module implemented on the processor 13. As above, this module generates LCH packets in the memory 6. These LCH packets contain the "SAR-PDUs" whose structure known per se is represented in FIG. 5 plus a type field called "LCHPDUtype", a sequence number and a CRC as may be seen in FIG. 6. However, here, contrary to the previous case, it is not the HiperLAN/2 DLC but a specific program, called 1394CL, that will handle these LCH packets and will create in the DLC memory 6 an 802.11 layer 2 frame such as that represented in FIG. 4. This specific program is implemented on the controller 4 of the 802.11 DLC. It is therefore an additional task which runs on the microcontroller in addition to its usual task delegated to the 802.11a DLC. However, it may also be executed by the central processor PPC. This frame will be able to be dispatched by the 802.11 DLC on the wireless network. The 802.11 frame can contain several LCH packets, although in the case of the asynchronous traffic, we will not generally wait to have several LCH packets and we will dispatch each LCH packet as soon as possible, or even individually. In the case of the isochronous traffic detailed later this will no longer be the case.

The 1394 isochronous traffic, for its part, is transferred over the wireless network according to the HiperLAN/2 standard at layer 2 as follows. The 1394 isochronous frames arrive, like the asynchronous frames, at the 1394 interface 8. However, contrary to the asynchronous traffic, handled by the 1394 SSCS software module on the PPC, the isochronous traffic is handled by a hardware SSCS 1394 module in FIG. 1 No. 7. It is therefore this hardware module which will construct the "SAR-PDUs" and the LCHs containing them in the memory of the DLCs 6. Here also these LCH packets will then be handled by the HiperLAN/2 DLC FIG. 1 No. 5 which will dispatch them over the wireless network via the physical layer FIG. 1 No. 3.

Should one wish to dispatch this isochronous 1394 traffic over the wireless network according to the 802.11 protocol according to the exemplary embodiment of the invention, the HiperLAN/2 DLC will be deactivated and, as in the case of the asynchronous 1394 traffic, the specific program will construct an 802.11 layer 2 frame consisting of LCH packets. Preferably the frame will consist of 4 LCH packets of 54 bytes i.e. 216 this corresponding to an FEC message. Indeed the module implementing the transmission error correction (FEC standing for "Forward Error Correction") works on blocks of 216 bytes.

A variant implementation of the exemplary embodiment of the invention consists in making direct use of the "SAR-PDU" packets in the 802.11 frame without dressing it up in LCH form. Specifically, the implementation described uses the LCHs, since the 1394 SSCS module used in the circuit produces this type of packet directly, although the switch from the "SAR-PDU" packet to the LCH packet is, in any logic, an operation delegated to the HiperLAN/2 DLC and not to the 1394 SSCS module as defined in the standard. The essential thing is to reuse the work of chopping the 1394 frame done by the 1394 SSCS module, the exact format of the packet arising from this module and that is used in the 802.11 frame has no influence on the operation of the method.

The problem of the identification of these 802.11a packets as transporting 1394 frames and therefore having to be, on the receiver, transmitted to this 1394CL module may be resolved in several ways. A first method consists in appending an LLC/SNAP packet to the 802.11a frame. This type of packet is described in RFC 802.2 and makes it possible to describe the type of data and the nature of the transport layers as well as information about the manufacturer. It is an 8-byte packet that is put at the start of the 802.11a packet which is then made up of a 24-byte header, of 4 public key seed bytes, of the 8 bytes of the LLC/SNAP packet, of the useful data, the LCH packets in our case, of 4 integrity code bytes and of 4 CRC bytes.

Another way of identifying the packets transporting the 1394 traffic over 802.11a is to create an MAC address specific to this traffic at the 802.11a driver level. A second MAC address can be created by a station in an 802.11a network by repeating the authentication and association phases such as they are provided for in the standard with a new MAC address. Subsequently, the hardware must be programmed to filter both these MAC addresses and not only the first so as to be recognized as recipient of the packets destined for these two MAC addresses. This MAC address may be a unicast address or multicast address. The advantage of a multicast address is the possibility offered to IEEE 1394 stations of registering at a common MAC address associated with an isochronous link. The multicast MAC addresses are created by a higher-level convention. For example, a set of multicast MAC addresses can be created by default on initiation for the 1394 traffic. In this case it is possible to do away with the LLC/SNAP packet. This method offers the advantage of isolating the 1394 traffic from the remainder of the traffic through the use of specific MAC addresses, while that using the LLC/SNAP packet allows a noncompatible item of equipment to identify an unknown type of packet and to ignore it. The 802.11a driver, in this case will read the destination MAC address of the frame, recognize the address dedicated to the 1394 over 802.11a traffic and pass the frame to the 1394CL module.

At the 802.11a driver level, the 1394 traffic is processed in the same manner as the Ethernet traffic dispatched by the "data delivery" module 48. If nothing is done to differentiate between the traffic, then the Ethernet traffic might disturb the dispatching of the 1394 frames. It is possible to resolve this problem through statistical management of the traffic by dispatching an Ethernet frame for five 1394 frames for example.

It will be apparent to the person skilled in the art that the invention, although described within the framework of the use of the circuit considered, is not limited to the use of this circuit but may be used in any system comprising substantially the same modules. It is also obvious that the implementation, both software and hardware, of these modules does not influence the manner of operation of the invention. This invention may also be generalized to protocols other than 802.11a, such as the other protocols of the 802.11 family, but also to protocols of other families. It will also be apparent to the person skilled in the art that the elementary packets that are grouped into a frame according to the protocol used on the wireless network, may be modified as regards the details thereof relative to the solution set forth here.

The invention claimed is:

1. A method of transmitting data over a wireless network, the method comprising:
   receiving data for a first frame formatted according to a first cable bus protocol;
   creating segmentation and reassembly (SAR) packet data units from the received data via an IEEE 1394 SSCS module;

inserting the segmentation and reassembly (SAR) packet data units into one or more long channel (LCH) packets via a segmentation and reassembly (SAR) module according to a format corresponding to layer 2 of a second protocol for data transmission over the wireless network;

constructing a frame in accordance with layer 2 of a third protocol for data transmission over the wireless network, the third protocol being different from the second protocol, the frame comprising said one or more LCH packets; and transmitting the constructed frame over the wireless network according to the third protocol.

2. The method according to claim 1, wherein the cabled bus is an IEEE 1394 bus, the second protocol for data transmission over the wireless network is HiperLAN/2 and the third protocol for data transmission over the wireless network is a protocol from a family of IEEE 802.11 protocols.

3. The method according to claim 2, the HyperLAN/2 protocol layer 2 obtaining the packets as segmentation and reassembly packet data units.

4. The method according to claim 1, wherein the frame is constructed from said one or more long channel packets formatted according to an intermediate format defined by said layer 2 of the second protocol for data transmission over the wireless network, the constructed frame being in accordance with the third protocol for data transmission over the wireless network, the constructed frame being distinguished from other frames transmitted over the wireless network by a specific identifier in the constructed frame.

5. The method according to claim 4, wherein the specific identifier comprises a logical link control packet appended to an IEEE 802.11 frame.

6. The method according to claim 1, wherein the frame is constructed from said one or more long channel packets formatted according to an intermediate format defined by said layer 2 of the second protocol for data transmission over the wireless network and in accordance with the third protocol for data transmission over the wireless network, the constructed frame being distinguished from other frames through the use of specific media access control (MAC) addresses identifying origin and destination of the constructed frame.

7. The method according to claim 6, wherein the specific MAC addresses comprise first and second addresses, a first address at an IEEE 802.11 driver level and a second address created by repeating IEEE 802.11 authentication and association phases.

8. A data transmission apparatus comprising:
means for receiving data for a first frame formatted according to a first cabled bus protocol,
means for connecting to a wireless network,
an IEEE 1394 SSCS module for processing the received data to create segmentation and reassembly (SAR) packet data units;
a segmentation and reassembly module for inserting the segmentation and reassembly (SAR) packet data units into one or more long channel (LCH) packets according to a format defined by a second protocol for data transmission over the wireless network,
wherein the apparatus further comprises means for generating a second frame for transmission in accordance with layer 2 of a third protocol for data transmission over the wireless network, the third protocol being different from the second protocol for data transmission over the wireless network, by inserting the one or more long channel packets into the second frame, the second frame being formatted according to layer 2 of the third protocol.

9. The apparatus according to claim 8, wherein the cabled bus is an IEEE 1394 bus, the second protocol for data transmission over the wireless network is HiperLAN/2 and the third protocol for data transmission over the wireless network is a protocol from a family of IEEE 802.11 protocols.

10. The apparatus according to claim 8, wherein the second frame comprises layer 2 information necessary for encapsulation and transmission of the one or more long channel packets as said second frame for transmission generated with aid of said layer 2 of the third protocol.

* * * * *